No. 765,778.

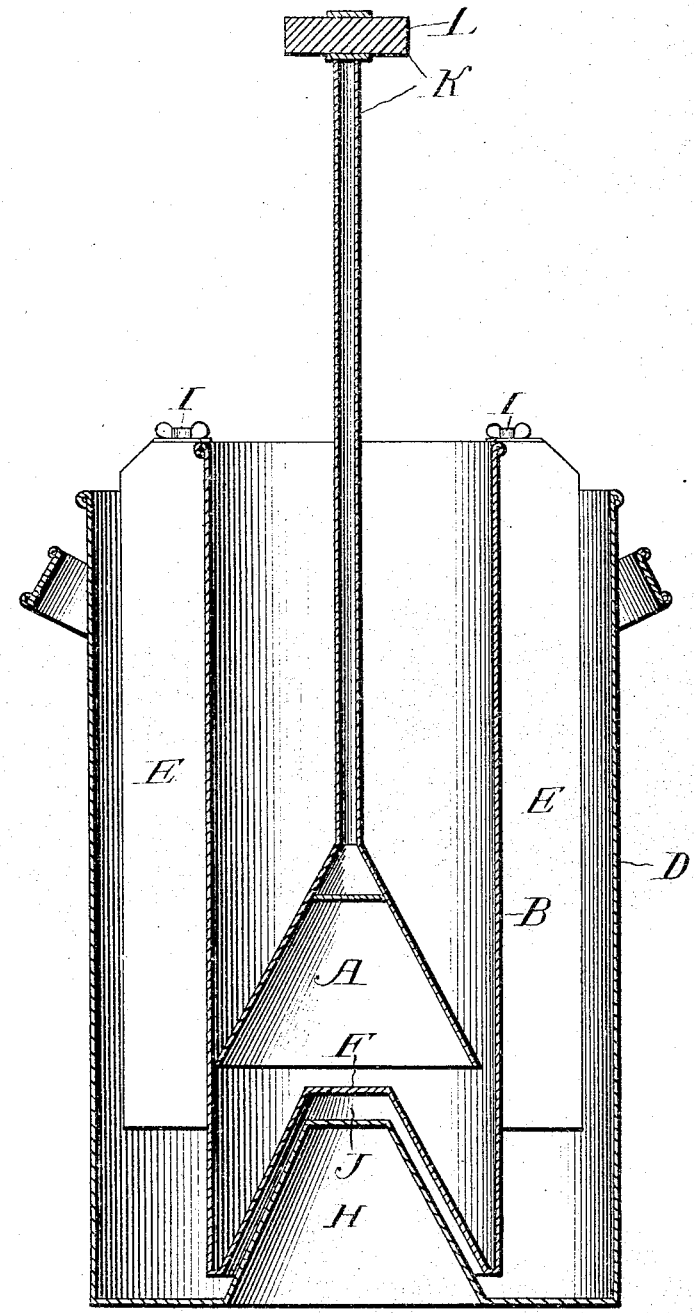

Patented July 26, 1904.

UNITED STATES PATENT OFFICE.

GEORGE W. KENNEDY, OF THORNTON, IOWA.

CREAM OR MILK AERATOR.

SPECIFICATION forming part of Letters Patent No. 765,778, dated July 26, 1904.

Application filed July 1, 1903. Serial No. 163,904. (No model.)

*To all whom it may concern:*

Be it known that I, GEORGE W. KENNEDY, a citizen of the United States, residing at Thornton, in the county of Cerro Gordo and State of Iowa, have invented certain new and useful Improvements in Milk and Cream Aerators and Coolers, of which the following is a full, clear, and exact description.

This invention relates to milk and cream aerators and coolers.

The object of the invention is to produce a milk and cream aerator wherein the contents being aerated will be constantly under the influence of a surrounding wall of cool water, and, further, to produce a dasher and milk or cream containing can so correlated in shape as to produce a highly-efficient aeration of the contents.

A further object of the invention is to produce an aerator of the character noted which will prove satisfactory in use, simple in construction, and comparatively inexpensive to manufacture.

With the above and other objects in view the invention consists in the details of construction and in the arrangement and combination of parts to be hereinafter more fully set forth and claimed.

In describing the invention in detail reference will be had to the accompanying drawing, forming part of this specification, and wherein like characters denote corresponding parts, in which the figure is a vertical section of my invention.

In the drawing, D is an outer or large can adapted to contain water for cooling the contents being aerated in the small can B. The can D is provided with three or more vertical inwardly-extending ribs or guides E, the limiting vertical edges of which serve to guide the can B and prevent lateral movement thereof. The bottom of the can D is formed with the inwardly-projecting frustum H, which is adapted to enter a similarly-formed bottom F of the can B. The can B is of such length as will permit a slight reciprocation thereof, and when buoyed by the water in the can D a space J will be left between the bottoms F and H and the water will be free to circulate therein. The upward movement of the can B is limited by the thumb-nuts I, secured to the ribs E.

The aeration is produced by reciprocating the cone-shaped dasher A, having its top constructed so that its interior conforms to the shape of the bottom F of the can B and when depressed fits snugly around said bottom. The dasher is provided with a stem K and a handle L for operating purposes.

The operation of the device is substantially as follows: The can B is placed inside the large can D and after being lowered to the bottom is held in place laterally by the vertical guides E and is prevented from rising beyond the top of the can D by turning the thumb-nuts I, secured to the top of the guides E. The space between the two cans B and D is filled with cold water, and the milk or cream is put into the inner can B. By means of the handle L the dasher A is forced down to the bottom of the can B. When the dasher A begins to pass down over the bottom F, the air contained in the former will escape around the outer circumference of the dasher A and passing upward through the milk or cream will aerate and cool the same. When the dasher A has reached the bottom of the can B, a further pressure on the handle L will force the entire can B to the bottom of the can D and the water contained in the space J between the bottoms F and H will be forced out, passing out around the outer circumference of the bottom of the can B. By a quick withdrawal of the dasher A the consequent suction and vacuum will raise the can B as far as permitted by the thumb-nuts I, the cold water returning and filling the space J between the bottoms F and H. In withdrawing the dasher A the vacuum in same will absorb the particles of impure air in the milk or cream and discharge them when the dasher is raised out of the milk or cream.

I claim—

1. A cream or milk aerator comprising a cooling-receptacle having the central portion of its bottom extending inwardly, a cream-containing can within said cooling-receptacle having its bottom corresponding in shape to that of the cooling-receptacle, means for retaining the cream-containing can against lateral movement, means for permitting a slight reciprocation of said cream-containing can, a reciprocating dasher for agitating the contents of the cream-containing can; said inwardly-projecting bottoms and dasher lying one within the other when the dasher is completely depressed.

2. A cream or milk aerator comprising a cooling-receptable, a cream-containing can within said cooling-receptacle, diametrically-extending guides secured in the cooling-receptacle for retaining the cream-containing can against lateral movement, thumb-nuts secured to the top of said guides to limit the reciprocation of the cream-containing can and a reciprocating dasher for agitating the contents of the cream-containing can.

In testimony whereof I have signed my name to this specification in presence of two witnesses.

GEORGE W. KENNEDY.

Witnesses:
CHAS. B. HOPLEY,
S. DOWNING.